United States Patent [19]

Harshbarger

[11] Patent Number: 4,536,792
[45] Date of Patent: Aug. 20, 1985

[54] METHOD AND APPARATUS FOR TESTING A CRT DISPLAY UNDER BEAM DUTY CYCLE VARIATION

[75] Inventor: John H. Harshbarger, Xenia, Ohio

[73] Assignee: Visual Information Institute, Inc., Xenia, Ohio

[21] Appl. No.: 554,843

[22] Filed: Nov. 23, 1983

[51] Int. Cl.³ .............................................. H04N 7/02
[52] U.S. Cl. ..................................... 358/139; 324/404
[58] Field of Search ................... 358/139, 10; 324/404

[56] References Cited

U.S. PATENT DOCUMENTS 4,093,960 6/1978 Estes .................................. 358/139

*Primary Examiner*—Howard W. Britton
*Attorney, Agent, or Firm*—Albert L. Jeffers; John F. Hoffman

[57] ABSTRACT

A method and apparatus for testing the geometry of a cathode ray tube raster scan under beam duty cycle variation. Alternate polarities of white on black and black on white images of a test pattern are displayed on the CRT screen, and the displacement of a reference point from one polarity to the other is measured to determine quantitatively the amount of displacement. Preferably, the pattern comprises a plurality of regularly arranged and spaced graphic elements, such as a bar, dot or dot grating pattern, wherein the pattern occupies a low percentage of the screen area. By alternately switching the polarity, the electron beam of the CRT undergoes wide swings in the amount of current it draws from the high voltage supply, and the amount of image displacement and size deviation can be readily measured.

23 Claims, 16 Drawing Figures

METHOD AND APPARATUS FOR TESTING A CRT DISPLAY UNDER BEAM DUTY CYCLE VARIATION

BACKGROUND OF THE INVENTION

The present invention relates to a method and apparatus for testing CRT displays, such as computer displays, closed circuit television monitors, and broadcast televisions, and relates particularly to a method and apparatus for testing the effect of beam duty cycle variation on the accuracy of the display.

Modern CRT displays, such as those used in computer applications, often demand a high level of accuracy in the raster scan geometry, and if inaccuracies are present, it is important to be able to quantify such inaccuracies. Numerous systems are currently being utilized in which an analysis of data can be made by taking measurements directly off the image displayed on the screen, and the size and location of the image is critical to an interpretation of the data. For example, in computerized medical X-ray technology, tumors and organs are displayed directly on a computer CRT screen, so that accuracy in terms of size, location and shape are of paramount importance. Similarly, the use of CAD/CAM technology for design and production engineering requires that the projected image accurately represent the data which is being generated by the computer.

In generating an image on the screen of a CRT, the electron beam is caused to scan the screen in a conventional raster pattern comprising a plurality of interlaced or non-interlaced horizontal lines with the intensity of the beam varied to develop the image on the screen. With a background which is basically neutral or dark, the image on the screen will be developed by increasing the current of the electron beam so that the screen phosphors impinged by the high current beam will be excited thereby producing localized areas of high illumination. The illuminated areas form the image on the screen. By modulating the intensity of the beam as it scans the screen, various shades of gray can be produced, in a black and white display, and the overall character of the image display can have different levels of brightness. In many computer displays, the beam has only two intensities, a high intensity to form the image and a low intensity to form the background, although the polarity can be reversed so that the background is of high intensity, that is, highly illuminated, and the image of low intensity, that is, of a darker shade. Regardless of the character of the display, the more area of the screen that is highly illuminated, the greater will be the amount of current drawn from the high voltage supply by the beam. Similarly, if the display has an overall higher level of brightness, the electron beam will draw more current than will a low overall brightness display. In some computer displays, the "low intensity" areas are at a black level.

A problem which is inherent in almost all CRT displays, and which is more prevalent in lower quality displays, is a variation in the position, and possibly the size, of the image displayed on the screen, as a function of the amount of current drawn from the high voltage supply by the electron beam. If the high voltage supply of the CRT is limited in any way, as more current is drawn therefrom by the electron beam in generating a bright display image or a display image that has a relatively large amount of high illumination image area compared to the amount of background area, the voltage drops in the high voltage supply. When this voltage drops, it causes a shift in the magnetic field of the deflection control system for the electron beam thereby affecting centering of the image, and it may also cause a difference in the deflection angle, therefore affecting the size of the image. For example, consider an image generated on the screen, such as a technical drawing, wherein the lines of the drawing are highly illuminated and occupy a relatively low percentage of the screen and the background is at a low or black illumination level. If the polarity of the image is reversed, wherein the background is at a high illumination level and the lines of the drawing at a low illumination level, there will likely be a shift in the position of the image and also a possible change in its size. This is because when reversing the polarity, much more current will be drawn by the electron beam thereby causing a voltage drop in the high voltage supply. This change in voltage affects the strength of the beam control magnetic field thereby resulting in the displacement of the image on the screen.

This phenomenon can result in inaccuracies in the image displayed which may be quite significant, depending on the application. For example, if the CRT is used to display a computer generated image of a tumor in a computerized medical X-ray installation, and if the display is calibrated for a given level of illumination, the size and position of the tumor as display on the image will differ from its actual position if the level of illumination of the display is different from that at calibration.

If the display is utilized for representing a technical drawing in a CAD/CAM application, as the drawing is built up thereby adding more area of illumination, the duty cycle of the beam, that is, the average amount of current drawn from the high voltage supply, will increase thereby reducing the voltage in the high voltage supply and causing a variation in the size and location of the image. Similarly, if the polarity of a portion of the drawing is reversed, as is often done in computer displays to highlight the portion of the image displayed on the screen, this will increase the beam duty cycle and result in a variation in the size and location of the displayed image.

Although high quality displays will exhibit less of this effect than low quality displays, there is a need for the ability to quantify the amount of size and centering deviation for a particular display so that the deviation can be corrected for.

SUMMARY OF THE INVENTION

The method and apparatus of the present invention, in one form thereof, enables the amount of image centering and size deviation to be quantified quickly and easily by generating test patterns on the screen of alternating polarities wherein the test pattern occupies a relatively low percentage of the overall screen area so that duty cycle variation as the polarity is reversed is nearly maximized. A conventional test pattern generator generates one of a number of different patterns, such as a bar pattern, dot pattern or dot grating pattern on the screen, which comprises a plurality of regularly spaced orthogonally arranged narrow lines or dots, or a combination thereof, wherein the pattern occupies a very small percentage of the screen when compared to the background. For example, the lines and/or dots may occupy as little as 0.5% to 5% of the screen area with the background occupying substantially the remainder of the screen area. The graphic images, which are the lines or dots of the pattern, for example, are of high intensity and the background of low intensity in one polarity, and are of low intensity with the background at high intensity in the reverse polarity so that there is a swing in beam duty cycle that is quite large thereby affecting the high voltage supply voltage level as much as possible. As the image is switched back and forth between one polarity and reverse polarity, the positions of the bars or dots will change to a maximum extent characteristic of the particular CRT display in question, and by measuring the difference in the location of a given reference point, which may be the center of a dot or the intersection point of two of the bars, the amount of deviation can be quantified.

In one form of the invention, a bar or dot or dot grating display is generated on the screen, the polarity is manually switched back and forth and the distance between the positions of a given reference point in one polarity and reverse polarity are measured. In a preferred form of the method according to the present invention, the polarity is caused to switch back and forth automatically at a selected rate, and if this rate is selected sufficiently high, the images will remain on the screen so that very accurate measurement of the displacement of the reference point can be made. It has been found that certain systems will exhibit the duty cycle image variation problem to different extents depending on the frequency at which the polarity is reversed, so that by enabling the user performing the test to vary the frequency, a search for any particular rate which may be worse than others can be made. For most displays, however, a polarity switching rate of one cycle per second will cause the displacement problem to be exhibited.

Although test pattern generators in the past have included a manual control for switching the polarity from white on black to black on white, utilizing polarity switching in a method to measure the amount of image displacement and size variation in response to duty cycle variation has not been done.

Although manual switching back and forth between polarities is suitable for implementing the method of the present invention, this procedure is quite tedious and makes accurate measurements of the displacement of the reference points difficult. Automatic polarity switching is preferred because it enables the person performing the test to locate the reference points and measure the displacement with greater accuracy. Accordingly, causing polarity reversal to occur automatically and at a selected rate constitutes a significant improvement over the manual test method of the present invention. The ability to vary the rate enables resonant points in the high voltage supply filter which exhibit particularly worse responses to be identified.

The apparatus according to one form of the invention utilizes a conventional bar dot pattern generator and a polarity circuit which reverses the polarities of the video portion of the pattern signal so that pulses which were previously at a high amplitude level will be at the low level, and the low level signal areas between the video pulses are the high amplitude level. In the preferred form of the apparatus according to the invention, the polarity circuit is located in series with the pattern generator and the signal output circuitry for producing the video pattern signal connected to the CRT being tested. The rate of polarity reversal is controlled by a variable frequency oscillator, such as a multivibrator.

The particular pattern which is generated on the CRT screen may be any one or a combination of conventional test patterns, such as a bar pattern, dot pattern or dot grating pattern, but it is desirable that the amount of screen area occupied by the graphic elements making up the pattern, that is, the bars or dots, be maintained at a low level so that the beam duty cycle variation on polarity reversal can be generally maximized. Although other types of patterns can be utilized, the patterns mentioned above are preferred. The test method and apparatus for performing the test can be utilized in conjunction with a black and white display, other monochrome displays such as green or amber displays typically used in computer applications, and color displays.

The invention, in one form thereof, provides a method for testing the geometry of a raster scan under beam duty cycle variation which comprises generating by the electron beam of the CRT on the display screen thereof a pattern comprising a plurality of graphic elements defining a plurality of reference points on the screen, the graphic elements being either high or low intensity on a screen background of the opposite high or low intensity. The graphic elements occupy a very low percentage of the scanned screen area and the background occupies a very high percentage of the scanned screen area. The polarity of the graphic elements and screen background are reversed so that the graphic elements are at the opposite intensity level as is the background, and the distance between the position on the screen of one of the reference points before polarity reversal and the position on the screen of the reference point with the polarity reversed is measured to determine the amount of deviation in display location caused by the polarity reversal. In one form of the invention, the graphic elements are vertical and horizontal bars or dots, or a combination thereof, and the reference points are defined by the intersections of the bars or the dots.

The invention, in accordance with another form thereof, provides an apparatus for testing the geometry of a CRT raster scan under duty cycle variation. The apparatus comprises means for controlling the position and intensity of the electron beam of the CRT to produce on the screen thereof a plurality of graphic elements on a background, wherein the graphic elements define a plurality of reference points on the screen. The graphic elements occupy a very low percentage of the scanned area of the screen and the background occupies a very high percentage of the scanned area of the screen. A pattern polarity control means causes the intensity polarity of the CRT beam to rapidly and automatically cyclically reverse between a first polarity in which the graphic elements are of a high intensity and the background is of a low intensity and a second polarity in which the graphic elements are of a low intensity and the background is of a high intensity.

It is an object of the present invention to provide a method and apparatus for testing the response of a CRT display to beam duty cycle variation wherein the amount of image displacement can be quantified with a high degree of accuracy.

It is a further object of the present invention to provide a technique and apparatus whereby the effect on image display as a result of beam duty cycle variation can be qualitatively observed.

It is a still further object of the present invention to provide a method and apparatus for testing image size variation and position displacement resulting from beam duty cycle variation that can be easily implemented.

BRIEF DESCRIPTION OF THE DRAWINGS

The aforementioned features and advantages of the present invention and the manner of attaining them will become more apparent and the invention itself will be better understood by reference to the following description of an embodiment of the invention taken in conjunction with the accompanying drawings wherein.

DETAILED DESCRIPTION

Figure 1:
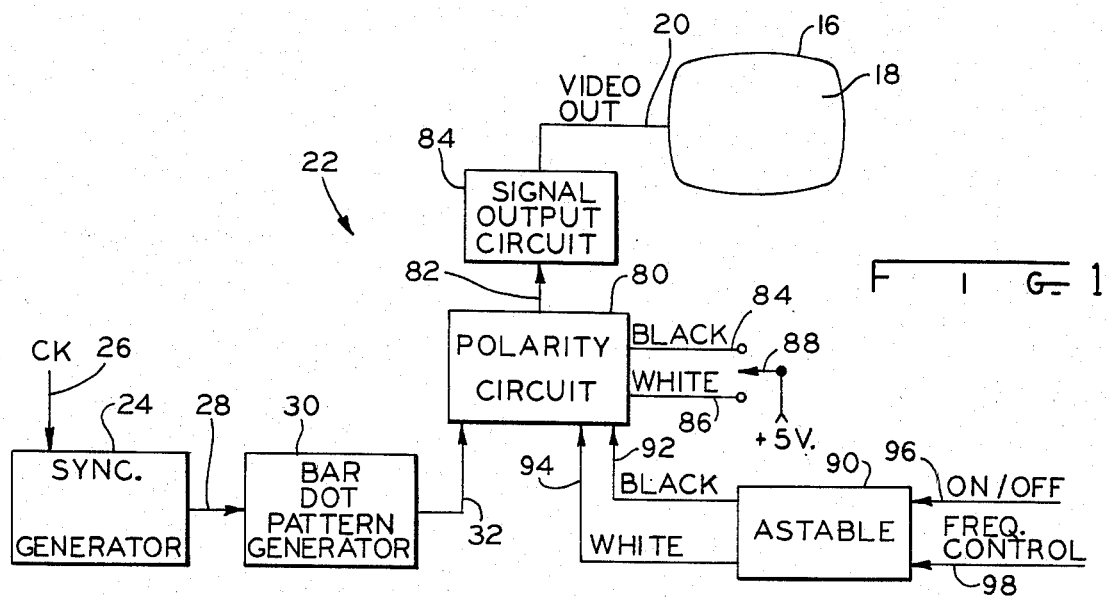
FIG. 1 is a block diagram of the test apparatus according to one form of the invention connected to a CRT display.

With reference now to the drawings, and in particular to FIG. 1, there is illustrated a cathode ray tube 16, which may be a closed circuit television monitor, a broadcast television, or a computer display, having conventional circuitry for producing an electron beam that scans the face of screen 18 under the control of a magnetic field. Video output line 20 from test apparatus 22 is connected to the video input of CRT 16.

Figure 3:
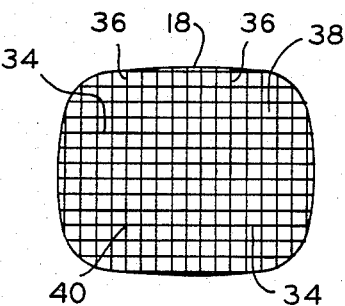
FIG. 3 is a diagrammatic view of a CRT display screen having a black bar pattern on a white background.
Figure 4:
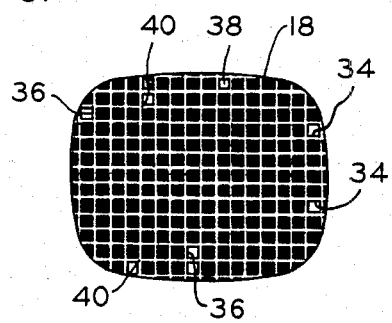
FIG. 4 is a view similar to FIG. 3 wherein the polarity has been reversed such that the bars are white on a black background.
Figure 12:
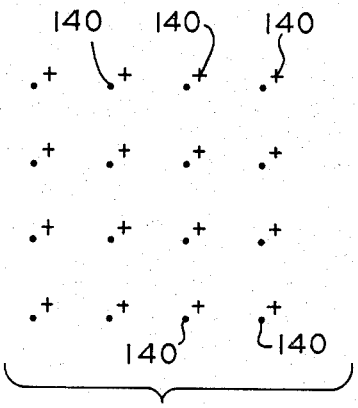
FIG. 12 is an enlarged diagrammatic view of a dot pattern showing the displacement thereof on polarity reversal.
Figure 14:
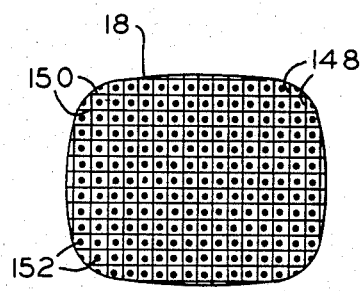
FIG. 14 is a diagrammatic view of a dot grating pattern.

Test apparatus 22 comprises a sync generator 24 clocked by a signal on line 26 and having an output 28 connected to conventional bar dot pattern generator 30. Sync generator 24 and bar dot pattern generator 30 may be combined in a single instrument, such as a Signal Source 1206A manufactured and sold by Visual Information Institute, Inc. of Xenia, Ohio. Bar dot pattern generator 30 is capable of selectively generating a bar pattern, comprising a plurality of vertical and horizontal narrow width bars, as shown in FIGS. 3 and 4, and a dot pattern comprising a plurality of horizontal rows and vertical columns of small area dots, as illustrated in FIG. 12, or a dot grating pattern as shown in FIG. 14, which comprises combined bar and dot patterns. Other patterns could also be generated, but the three patterns just discussed are preferred.

Bar dot pattern generator 30 produces on output 32 an electrical pattern signal to produce the selected pattern. The pattern signal on line 32 will include video pulses to control the intensity of the beam, blanking pulses to blank the beam during horizontal and vertical retrace, and will also often include various control and synchronizing pulses to control the scanning pattern of the beam of CRT 16. The polarity of the signal on line 32 will be changed or not changed by polarity circuit 80 and placed on output 82.

Referring now to FIGS. 4–7, the bar pattern will be discussed. FIG. 4 illustrates on the screen 18 of CRT 16 a typical bar pattern having a white on black polarity and comprising a plurality of horizontal bars 34 of high intensity illumination, a plurality of vertical bars 36 also of high intensity illumination on a screen background 38 either no non-illuminated or at very low level illumination. Bars 34 and 36 constitute the graphic elements making up the bar pattern and their intersections 40 are utilized as reference points in the test procedure of one form of the present invention.

Figure 5:
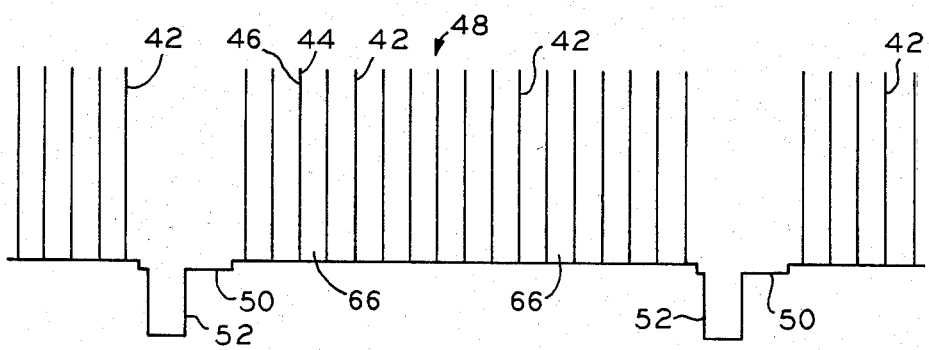
FIG. 5 is a horizontal rate video waveform for the generation of vertical bars having white on black polarity.

FIG. 5 illustrates the signal on line 8 that generates vertical bars 36 during one horizontal scan line and portions of the horizontal scans lines on either side thereof. Pulses 42 are the vertical pulses that increase the intensity of the electron beam at regularly spaced points across each scan of the screen thereby producing a plurality of regularly spaced points of high intensity illumination. Pulses 42 have positive going leading edges 44 and negative going trailing edges 46 producing the white on black polarity pattern illustrated in FIG. 4. Each line 48 or pulses 42 is separated by blanking pulses 50 to blank the beam during horizontal retrace, and synchronizing pulses 52 to synchronize CRT 16.

Figure 6:
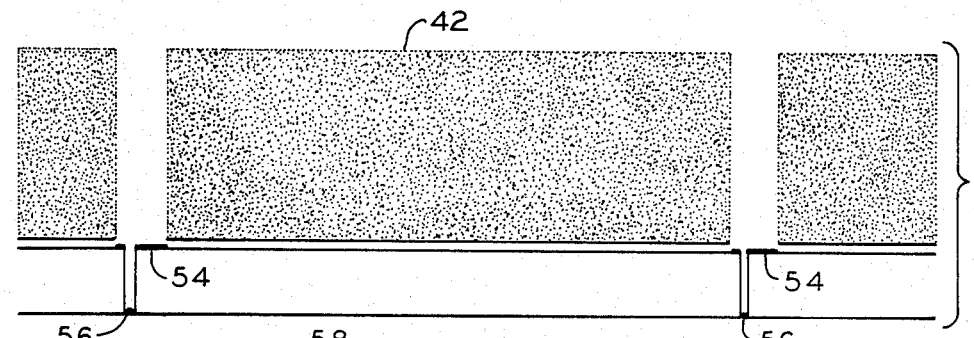
FIG. 6 is a vertical rate video waveform for the generation of vertical bars having white on black polarity.

FIG. 6 illustrates the generation of the vertical bars 36 at the vertical rate with white on black polarity, wherein the plurality of pulses 42 making up an entire field are separated by vertical blanking pulses 54 which blank the beam during vertical retrace, and vertical synchronizing pulses 56.

Figure 7:
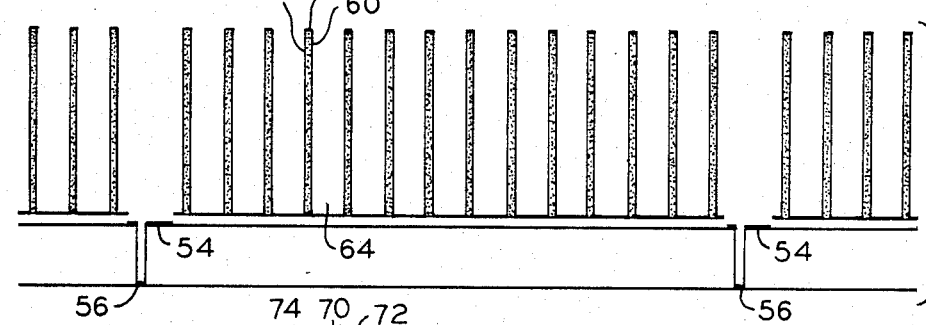
FIG. 7 is a vertical rate video waveform for the generation of horizontal bars with a white on black polarity.
Figure 15:
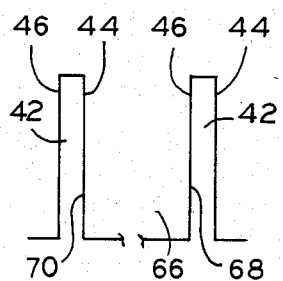
FIG. 15 is a time expanded view of a portion of the waveform of FIG. 5.

FIG. 7 illustrates the generation of the horizontal bars 34 of FIG. 4 with white on black polarity at the vertical rate with pulses 58, which are actually a series of pulses separated by horizontal blanking pulses 50 and synchronizing pulses 52 (not shown), having positive going leading edges 60 and negative going trailing edges 62. "Pulses" 58 typically occupy several lines of horizontal scan, although it is possible that they could occupy only a single line of horizontal scan depending on the width of bars 34. It will be seen that horizontal bar pulses 58 (FIG. 7) and vertical bar pulses 42 (FIG. 5) are separated by areas 64 and 66, respectively, of low amplitude signal level which causes a very low illumination of screen 18, possibly even no illumination where the background is completely black. With reference to FIG. 15, which is a time expansion of two of the pulses 42 of FIG. 5, it will be seen that the portion 66 of the signal between adjacent pulses 42 is in effect an inverted pulse having a negative going leading edge 68 and a positive going trailing edge 70. In any event, pulses 42 produce areas of high illumination on screen 18 and areas 66 produce areas of low illumination, thereby producing the vertical bars 36 shown in FIG. 4.

FIG. 3 shows the same pattern on screen 18 as is shown in FIG. 4 except that the polarity has been reversed so that the vertical bars 36 and horizontal bars 34 are of low intensity illumination, whereas the background 38 is at a high level of illumination. Thus, the image of FIG. 3 is of the reverse polarity of the image of FIG. 4 and, since bars 34 and 36 are relatively narrow and occupy a low percentage of the scanned area of screen 18, the electron beam of CRT 16 will have a high duty cycle thereby drawing a large amount of current from the high voltage supply.

Figure 8:
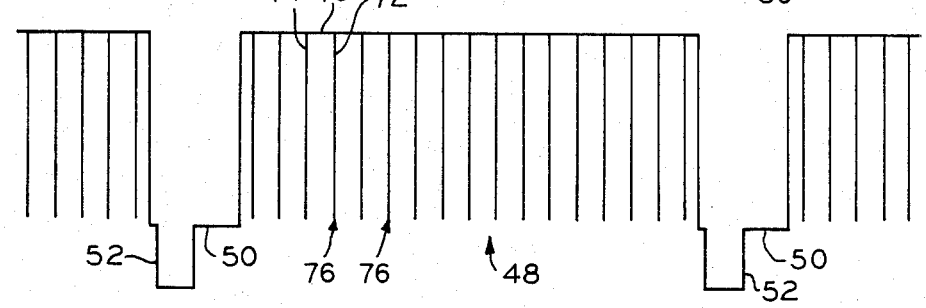
FIG. 8 is a horizontal rate video waveform for the generation of vertical bars with a black on white polarity.
Figure 16:
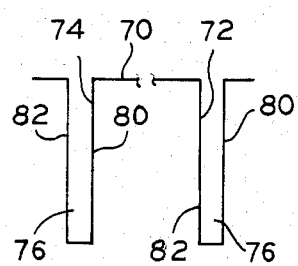
FIG. 16 is a time expanded view of a portion of the waveform of FIG. 8.

FIG. 8 illustrates the video signal on line 8, at the horizontal rate, for producing the pattern of FIG. 3. It comprises a plurality of positive going pulses 70 having positive going leading edges 72 and negative going trailing edges 74 separated by intervening areas 76, which are quite narrow, of low amplitude. Each horizontal line of video signal 48 is separated by horizontal blanking pulses 50 and horizontal synchronizing pulses 52. In comparing the waveform of FIG. 8 with that of FIG. 5, it will be seen that it is of the opposite polarity, namely, positive going pulses 42 in FIG. 5 are now the areas 76 of low amplitude, and the areas of low amplitude 66 in FIG. 5 are now the positive going pulses 70 in FIG. 8. With reference to FIG. 16, which is a time amplified representation of a portion of FIG. 8, it will be seen that low amplitude areas 76 are, in effect, inverted pulses having negative going leading edges 80 and positive going trailing edges 82, whereas pulses 70 can be viewed as positive going pulses having positive going leading edges 72 and negative going trailing edges 74. In any event, the high amplitude areas 70 of the signal produce areas of high illumination on screen 18 whereas the low amplitude areas 76 produce areas of low illumination.

Figure 9:
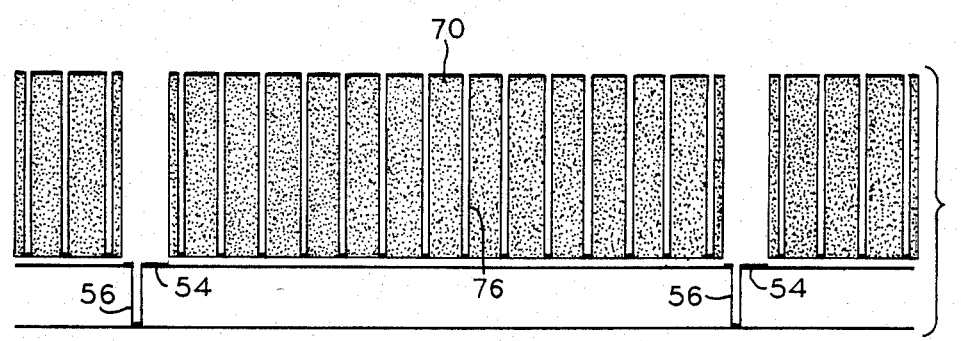
FIG. 9 is a vertical rate video waveform for the generation of horizontal bars with a black on white polarity.

FIG. 9 illustrates the black on white polarity signal comprising a series of positive going pulses 70, which are separated by blanking pulses 50 and synchronizing pulses 52, making up each horizontal line 34 in the pattern of FIG. 3 at the vertical rate. The areas of high illumination signal 70 are separated by narrow bands of low intensity signal 76, the latter producing the horizontal bars 34.

In addition to the bar patterns of FIGS. 3–9, other patterns, such as dot patterns and dot grating patterns can be produced using conventional techniques. Although a particular type of video signal has been shown to generate the bar pattern of FIGS. 3 and 4, other signals can be used and are considered to be within the scope of the present invention. Depending on the resolution of the system, the pattern can be selected such that the graphic elements, whether they be vertical bars, dots, or other geometric elements, occupy from about 0.5% to about 3% of the scanned area of the screen with the background occupying from about 99.5% to 97%, respectively, of the scanned area of the screen. Alternatively, and in another form of the invention, the graphic elements can occupy from about 1% to about 5% of the scanned area of the screen and the background occupying from about 99% to 95% of the scanned screen area. Graphic elements covering less than 0.5% or more than 5% of the screen can also be utilized, but it is preferred that the graphic elements be sufficiently large that they can be easily seen, yet do not occupy so much of the screen area that the duty cycle variation on polarity reversal is unduly reduced. The use of a pattern that covers the entire screen, such as in the bar pattern illustrated in FIGS. 3 and 4, is preferred because different amounts of position deviation may occur for different areas of the screen. However, the invention also contemplates generating the graphic elements on only a portion of the screen.

The polarity of the video signal on input 20 to CRT 16 is determined by polarity circuit 80 which receives as one of its inputs the video signal on line 32, which may be of white on black or black on white polarity, and produces on output 82 to the input of signal output circuit 84 a signal having the selected polarity. Signal output circuit 84 provides a signal on line 20 having the desired amplitude. Polarity circuit 80 has a black on white control input 84 and a white on black input 86 selected by switch 88 to cause the output signal on line 82 to either have a black on white or white on black polarity. Although the display on screen 18 has been referred to in terms of black on white and white on black, this is only for the sake of convenience, since the convention applies also to other monochrome screens such as green and amber, and color screens. Basically, the term "white" refers to the highly illuminated areas of the screen and "black" to the low intensity illuminated areas of the screen.

By selecting either input 84 or 86 to polarity circuit 80 by switch 88, either of the polarities can be selected, and they can be manually alternated by operating switch 88. In the preferred form of the invention, however, a variable frequency oscillator, such as astable multivibrator 90, has its outputs 92 and 94 connected to further control inputs of polarity circuit 80 selecting the black on white or white on black polarity. Astable multivibrator has an ON/OFF control 96 and a frequency control 98. Multivibrator 90 causes polarity circuit 80 to select alternate states of polarity automatically at a rate controlled by the frequency control on line 98. Because the images will remain on screen 18 even though the polarity is being switched back and forth, the displacement of the reference points caused by the polarity reversal can be easily measured without the necessity to manually switch between polarities, as would be the case if manual switch 88 were utilized.

Figure 2:
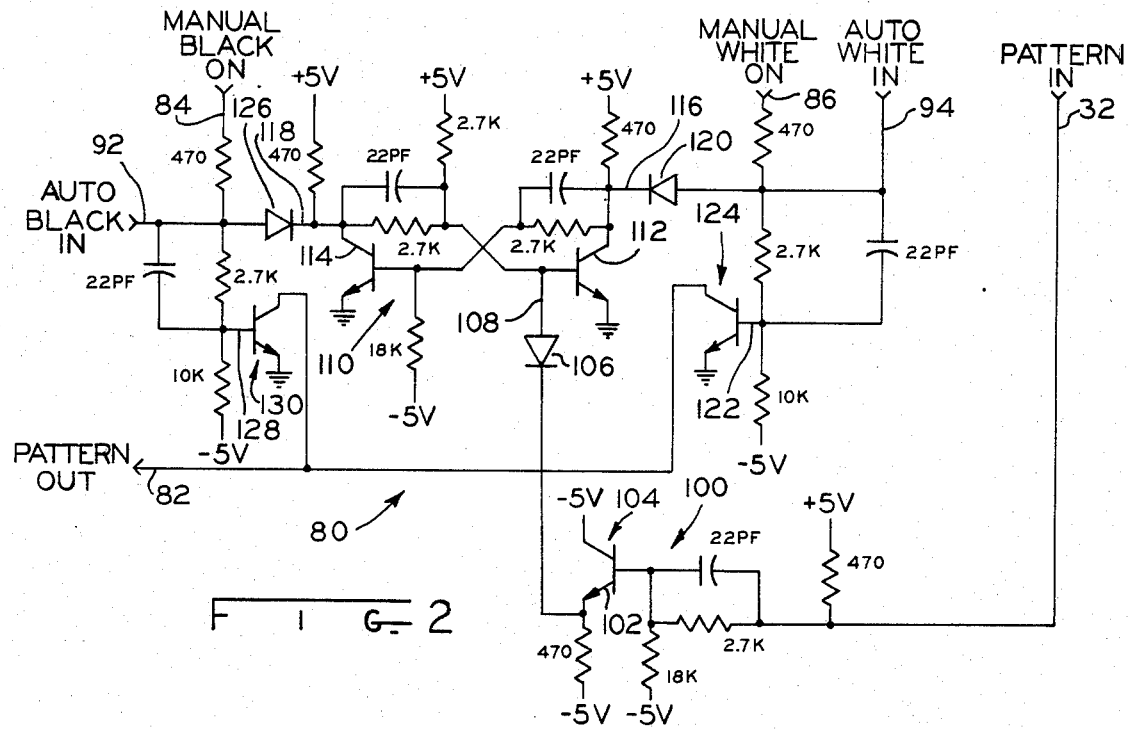
FIG. 2 is a detailed circuit schematic of the polarity circuit of FIG. 1.

Polarity circuit 80 is illustrated in FIG. 2. The pattern signal on line 32 is processed by emitter follower circuit 100 in which the emitter 102 of transistor 104 is connected through diode 106 to the trigger input 108 of bistable multivibrator 110 comprising transistors 112 and 114. Multivibrator 110 is caused to change state in response to the pulse input on its input 108 and provides at one of its outputs 116 a white on black background polarity and at its other output 118 the inverted polarity of black pattern on white background. Of course, depending on the polarity of the input signal on line 32, the respective outputs 116 and 118 would be just the reverse.

In order to select a white on black polarity, the control signal, either a DC signal on manual input 86 or the pulse signal on input 94 from astable multivibrator 90, will apply positive voltage to control diode 120 thereby opening the circuit path between output 116 and the base 122 of transistor 124. The output of transistor 124 is connected to output line 82, which is connected to the input of signal output circuit 84. Since the other control inputs 84 and 92 will be at ground, diode 126 will present an open circuit thereby blocking the inverted signal.

If switch 88 is thrown to the black on white polarity position in contact with input 84, however, or if astable multivibrator causes its output 92 to be active at that moment, control diode 126 will be opened by the application of positive voltage thereby permitting the signal to flow to the base 128 of transistor 130 and placing on output 82 the black on white polarity signal. Of course, under astable multivibrator control, the respective outputs 116 and 118 of bistable multivibrator 110 are alternately selected thereby providing automatic repetitive polarity reversal.

Figure 10:
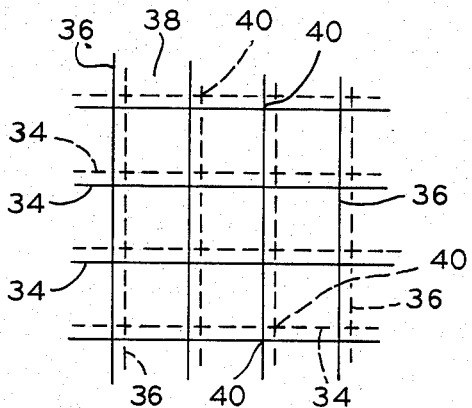
FIG. 10 is an enlarged diagrammatic view of a bar pattern showing displacement of the intersections of the bars on polarity reversal.

In testing a cathode ray tube display 16, a bar pattern, such as shown in FIGS. 3 and 4, may be utilized. The bar pattern is generated, such as by the apparatus described above, and produced on the face of screen 18. This pattern would appear as illustrated diagrammatically in FIG. 10, which comprises a plurality of vertical bars or lines 36 and a plurality of horizontal bars or lines 34, which are orthogonal to vertical bars 36 and intersect at a plurality of intersection points 40. For example, the pattern shown in FIG. 10 in solid line would be that of a black on white polarity wherein bars 34 and 36 are dark and the background 38 is light. This polarity will provide a relatively high duty cycle, thereby drawing a large amount of current from the high voltage supply.

Next, the polarity of the display is reversed by, such as by throwing switch 88, so that vertical and horizontal lines 36 and 34 will be of high illumination and the background 38 will be of low illumination. Since this provides a relatively low duty cycle for the electron beam thereby drawing a lower current from the high voltage supply, bars 34 and 36 will shift, as illustrated by the dotted line positions in FIG. 10. The direction of shift may vary from display to display, but often the shift will be in a 45° direction toward one of the corners of the screen.

Figure 11:
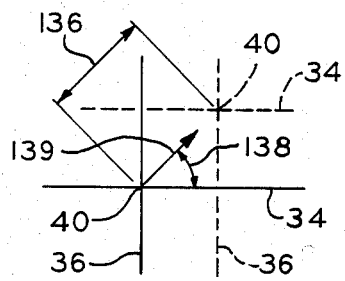
FIG. 11 is a further enlarged diagrammatic view of one of the bar intersections of FIG. 10 illustrating the quantification of displacement.

FIG. 11 illustrates the shift in the reference points 40 defined by the intersections of the vertical and horizontal lines shifted by polarity reversal. By measuring the distance 136, the amount of linear displacement can be determined, and by measuring the angle 138 of the displacement vector, the direction of displacement can be quantified. It may be desirable to take measurements at a plurality of different points on the screen so that any aberration of the displayed image caused by different amounts of displacement on different areas of the screen can be determined.

Rather than manually switching from one polarity to the another, it is preferable that automatic switching be utilized so that the two positions of the reference points before and after polarity reversal will remain on the screen simultaneously thereby enabling measurements to be taken more easily. Furthermore, by varying the frequency of the polarity reversal, different amounts of image displacement or size variation may be determined.

Figure 13:
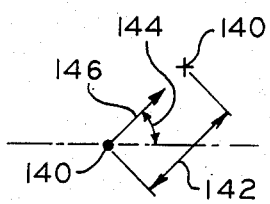
FIG. 13 is a diagrammatic further enlarged view of one of the dots of FIG. 12 illustrating the quantification of the dot displacement.

FIGS. 12 and 13 show how the test may be performed by using a dot pattern. In a dot pattern, a plurality of small points of screen illumination 140 are generated in a plurality of orthogonally related rows and columns. In one polarity, the dots will be located at the positions indicated by the circular points, and in the opposite polarity, they will shift to the positions shown by the crosses in FIG. 12. At one polarity, the dots will be of high illumination on a black background, and at the other polarity they will be points of low illumination on a high illumination background.

FIG. 13 illustrates how the shift in the positions of the reference points defined by the dots 140 can be made by measuring the distance 142 between the initial and shifted positions. The direction of movement can be measured by measuring the angle 144 of the displacement vector 146.

FIG. 14 illustrates a dot grating pattern wherein the vertical and horizontal bars 148 and 150 are combined with a pattern of dots 152 located at the geometric centers of the squares formed by bars 148 and 150. The same type of shifting as is illustrated in FIGS. 10-13 will occur in this pattern, and the reference points may be selected as either the intersections of the bars 148 and 150 or the locations of the dots 152.

While this invention has been described as having a preferred design, it will be understood that it is capable of further modification. this application is, therefore, intended to cover any variations, uses, or adaptations of the invention following the general principles thereof and including such departures form the present disclosure as come within known or customary practice in the art to which this invention pertains and fall within the limits of the appended claims.

What is claimed is:

1. A method of testing the geometry of a raster scan under beam duty cycle variation comprising:
    generating by the electron beam of a cathode ray tube on the display screen thereof a pattern comprising a plurality of graphic elements defining a plurality of reference points on the screen, said graphic elements being one of a high intensity or low intensity level on a screen background of the other of a high intensity or low intensity level and wherein the graphic elements occupy a very low percentage of the scanned screen area and the background occupies a very high percentage of the scanned screen area,
    reversing the polarity of the graphic elements and screen background to cause the background to be said one of the high intensity and low intensity levels and the graphic elements to be said the other of the high intensity and low intensity levels, and
    measuring the distance between the position on the screen of one of the reference points before polarity reversal and the position on the screen of said one reference point with the polarity reversed to determine the amount of deviation in display location caused by polarity reversal.

2. The method of claim 1 wherein the graphic elements are a plurality of vertical bars and a plurality of horizontal bars forming an orthogonal grid, and the reference points are the intersections of the vertical and horizontal bars.

3. The method of claim 1 wherein the graphic elements are a plurality of dots arranged in vertical columns and horizontal rows and the reference points are defined by the centers of the dots.

4. The method of claim 1 wherein the graphic elements are a plurality of vertical bars and a plurality of horizontal bars forming an orthogonal grid and a plurality of dots located respectively at the centers of grid squares formed by adjacent bars, and the reference points are defined by either the dots or the intersections of the vertical and horizontal bars.

5. The method of claim 1 including the step of rapidly cyclically reversing the polarity of the graphic elements and background to cause images of the graphic elements in both states of polarity to remain on the screen simultaneously during the step of measuring.

6. The method of claim 5 wherein the graphic elements are a plurality of vertical bars and a plurality of horizontal bars forming an orthogonal grid, and the reference points are the intersections of the vertical and horizontal bars.

7. The method of claim 5 wherein the graphic elements are a plurality of dots arranged in vertical columns and horizontal rows and the reference points are defined by the centers of the dots.

8. The method of claim 5 wherein the graphic elements are a plurality of vertical bars and a plurality of horizontal bars forming an orthogonal grid and a plurality of dots located respectively at the centers of grid squares formed by adjacent bars, and the reference points are defined by either the dots or the intersections of the vertical and horizontal bars.

9. The method of claim 5 including automatically generating a train of regularly spaced polarity reversing signals to control the reversal of polarity.

10. The method of claim 9 including varying the frequency of the polarity reversing signals.

11. The method of claim 1 wherein said graphic elements occupy from about 1% to 5% of the scanned screen area and the background occupies from about 99% to 95% of the scanned screen area.

12. The method of claim 1 wherein said graphic elements occupy from about 0.5% to 3% of the scanned screen area and the background occupies from about 95.5% to 97% of the scanned screen area.

13. The method of claim 1 wherein the graphic elements are distributed over substantially the entire scanned area of the screen, and including measuring the distances between the positions of a plurality of reference points before polarity reversal and with the polarity reversed, to thereby measure the deviation at a plurality of locations on the screen.

14. The method of claim 1 including measuring the direction of a vector defining the displacement of a reference point upon polarity reversal.

15. Apparatus for testing the geometry of a cathode ray tube raster scan under duty cycle variation comprising:
means for controlling the position and intensity of the electron beam of the cathode ray tube to produce on the screen of the cathode ray tube a plurality of graphic elements on a background wherein the elements define a plurality of reference points on the screen, and wherein the graphic elements occupy a very low percentage of the scanned area of the screen and the background occupies a very high percentage of the scanned area of the screen,
pattern polarity control means for causing the intensity polarity of the cathode ray tube beam to rapidly and automatically cyclically reverse between a first polarity in which the graphic elements are of a high intensity and the background is of a low intensity and a second polarity in which the graphic elements are of a low intensity and the background is of a high intensity.

16. The apparatus of claim 15 wherein said means for controlling the position and intensity of the electron beam comprises a pattern generator means for generating a vertical and horizontal bar pattern signal.

17. The apparatus of claim 15 wherein said means for controlling the position and intensity of the electron beam includes a pattern generator means for generating a vertical and horizontal bar pattern signal comprising a cyclically recurring pattern of positive going leading edge video pulses separated by a plurality of negative going leading edge video pulses, and said beam intensity polarity control means causes cyclical inversion of said positive going and negative going edge video pulses to thereby cause a vertical and horizontal bar pattern on the screen to alternate in polarity.

18. The apparatus of claim 17 wherein said beam intensity polarity control means includes a variable frequency oscillator means for controlling the frequency of video pulse inversion.

19. The apparatus of claim 15 wherein said means for controlling the position and intensity of the electron beam comprises a pattern generator means for generating a dot pattern.

20. The apparatus of claim 15 wherein said means for controlling the position and intensity of the electron beam includes a pattern signal generator means for generating a signal comprising a cyclically recurring pattern of positive going leading edge video pulses separated by negative going leading edge video pulses, and said beam intensity polarity control means causes cyclical inversion of said positive and negative going edge video pulses to thereby cause the graphic elements and background on the screen to alternate in polarity.

21. The apparatus of claim 20 wherein said beam intensity polarity control means includes a variable frequency oscillator means for controlling the frequency of video pulse inversion.

22. The apparatus of claim 15 wherein said means for controlling the position and intensity of the beam comprises a pattern generator means for generating a cyclically recurring electrical video signal comprising a plurality of relatively high amplitude regions and a plurality of relatively low amplitude regions to define the graphic elements on the screen, and said pattern polarity control means repetitively converts the low amplitude regions to high amplitude and simultaneously converts the high amplitude regions to low amplitude and vice versa in an alternating fashion at a controllable frequency.

23. A method a testing the geometry of a raster scan under beam duty cycle variation comprising:
generating by the electron beam of a cathode ray tube on the display screen thereof at least one graphic element defining a reference point, said graphic element being one of a high intensity or low intensity level on a screen background of the other of a high intensity or low intensity level and wherein the graphic element occupies a very low percentage of the scanned screen area and the background occupies a very high percentage of the scanned screen area,
reversing the polarity of the graphic element and screen background to cause the background to be said one of the high intensity and low intensity levels and the graphic element to be said the other of the high intensity and low intensity levels,
repetitively reversing the polarity of the graphic element and background to cause the graphic element to appear simultaneously on the screen in both polarities, and
measuring the distance between the positions on the screen of the reference point defined by the graphic element in both states of polarity to thereby determine the amount of deviation in display location caused by polarity reversal.

* * * * *